United States Patent [19]

Katoh

[11] Patent Number: 5,308,155
[45] Date of Patent: May 3, 1994

[54] CORE BAR MEMBER FOR RUBBER CRAWLER AND RUBBER CRAWLER DEVICE

[75] Inventor: Yusaku Katoh, Fukuyama, Japan

[73] Assignee: Fukuyama Gomu Kogyo Kabushikikaisha, Japan

[21] Appl. No.: 852,264

[22] PCT Filed: Aug. 2, 1991

[86] PCT No.: PCT/JP91/01039
 § 371 Date: Jun. 8, 1992
 § 102(e) Date: Jun. 8, 1992

[87] PCT Pub. No.: WO92/02399
 PCT Pub. Date: Feb. 20, 1992

[51] Int. Cl.$^5$ .............................................. B62D 55/24
[52] U.S. Cl. .................... 305/38; 305/35 EB
[58] Field of Search .............. 305/35 R, 35 EB, 38, 305/39

[56] References Cited

U.S. PATENT DOCUMENTS 5,131,728  7/1992  Katoh et al. ................. 305/35 EB

FOREIGN PATENT DOCUMENTS 0212675  8/1989  Japan ............................. 305/35 EB
0070687  3/1991  Japan ............................. 305/35 EB Primary Examiner—Russell D. Stormer
Attorney, Agent, or Firm—William A. Drucker

[57] ABSTRACT

A core bar member for a rubber crawler which includes a pair of projections, each having an upper face and left and right wing portions, the upper faces of the pair of projections protruding to a fixed height upward and having protruding parts having a width direction and of a fixed length in the width direction of the left and right wing portions, the upper faces of the left and right projections including the protruding parts being upwardly arcuate and having a center portion of the upwardly arcuate protruding parts being the bottom thereof. In accordance with a second embodiment the pair of the upper faces of the projections are upwardly arcuate and each has a center portion with the center portions being the bottom thereof, the protruding parts provided only in one side and extending in opposing directions to each other. In accordance with a third embodiment the pair of the upper faces of the projections are inclined upwardly in opposing directions to each other. The rubber crawler has an inner circumferential face and plural core bar members are arrayed and concealed with a fixed interval such that the projections protrude in the width direction on the inner circumferential face of the rubber crawler.

6 Claims, 6 Drawing Sheets

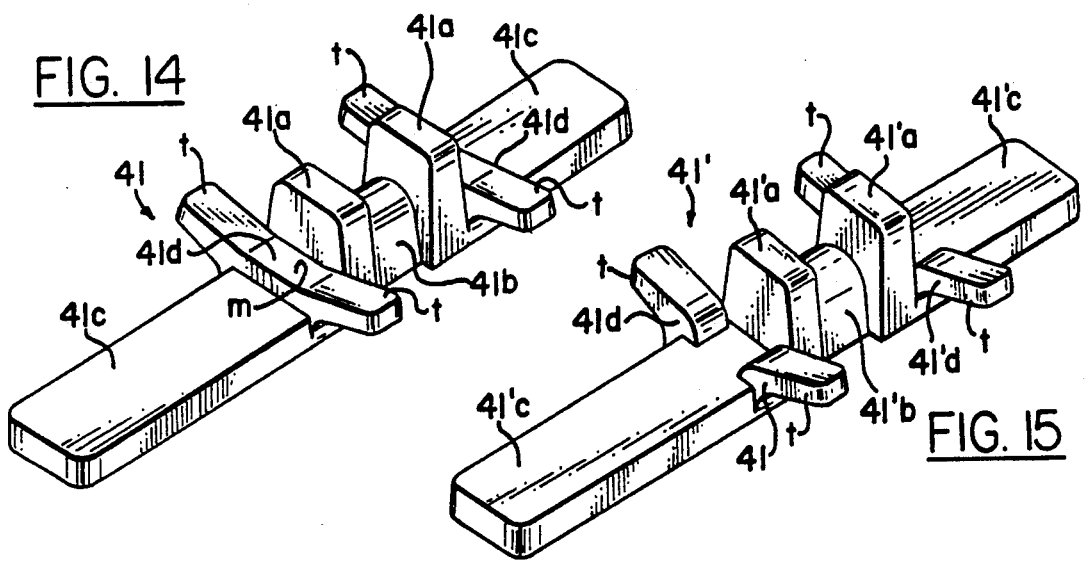
FIG. 14
FIG. 15
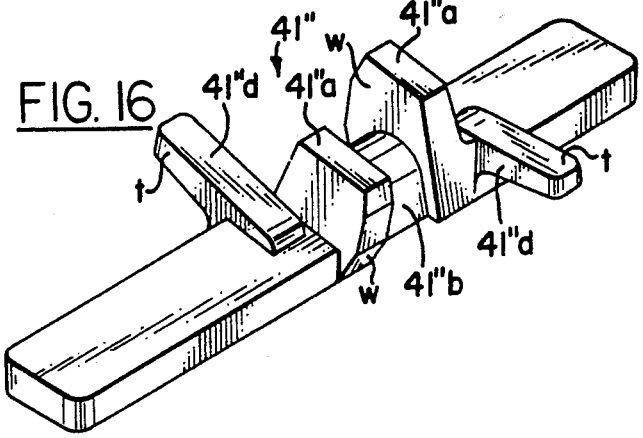
FIG. 16
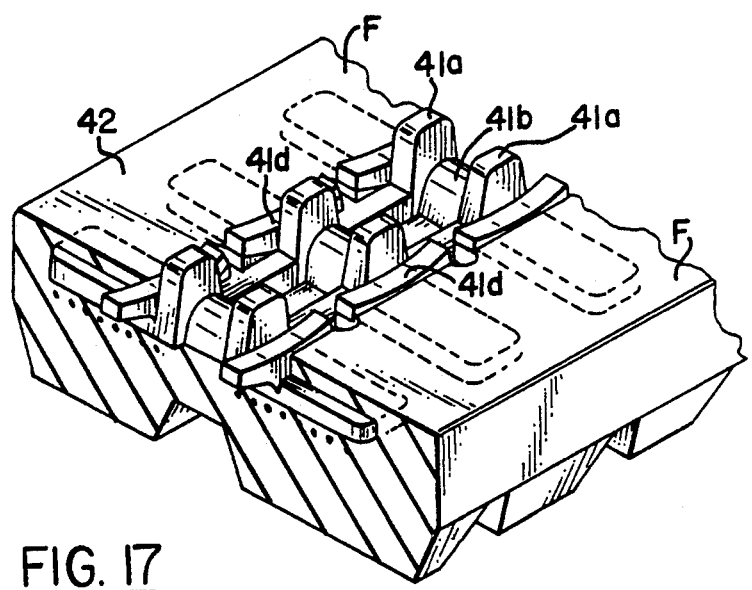
FIG. 17

CORE BAR MEMBER FOR RUBBER CRAWLER AND RUBBER CRAWLER DEVICE

FIELD OF THE INVENTION

The present invention relates to a core bar member which is used for rubber crawlers in transportable type construction equipment, and relates to a crawler device in which many core bar members are concealed in the inner circumferential face of the rubber crawler under specified conditions.

BACKGROUND OF THE INVENTION

Many types of construction equipment in which a steel-made caterpillar and rubber crawler are concurrently utilized as wheels thereof have been recently made available in the market.

FIG. 1 shows one of the examples of a rubber crawler of the above mentioned concurrent type and is a cross-sectional view in the width direction thereof, showing the relationship between the rubber crawler 101 and rolling wheel 102. In addition, there is shown a middle wheel 102a, a side wheel 102b, a core bar member 103, with a projection 103a and top face m of the core bar member, respectively, a steel cord 104, and a lug 105. FIG. 2 is a side view in the circumferential direction showing the relationship with the rolling wheel as well. In FIG. 2, t is a flange or protruding part of projection 103a, and s is the interval between core bar members 103. As shown in the drawing, protruding parts t, t are provided at the front and rear parts of the projection 103a, thereby causing the core bar member 103 to be T-shaped and the top face m thereof will be a rolling track with which the side wheel 102b is brought into contact.

In the above mentioned conventional rubber crawler, the side wheel 102b of the rolling wheel 102 is brought into contact with the top face m of the projection 103a so that the base rubber material will not be damaged, thereby providing good durability thereof. However, as the rolling wheel 102 drops as a result of being between the front and rear core bar members, its running vibration increases and is made large. Therefore, in order to improve operation, the dropping or sinking of the rolling wheel is decreased by narrowing the interval s between the core bar members by making a projection 103a of the core bar member T-shaped to provide it with protruding parts. However, in this case, as shown in FIG. 2, as the protruding part t drops or sinks due to the load when the rolling wheel 2 rides on the protruding part t (the projections 103a are inclined), dropping or sinking of the rolling wheel has not been resolved. Therefore, sufficient improvement cannot be obtained for lessening the vibrations. The above description deals with the case of a mid-flanged rolling wheel.

FIG. 3 is a cross-sectional view in the width direction, showing the relationship between the rubber crawler 102' and an outer-flanged rolling wheel 102' the shape of which is different from that of the above case. In FIG. 3, there is shown an inner wheel 102'a and outer flanges 102'b of the outer-flanged rolling wheel, respectively, a core bar member 103', a projection 103'a, a stepped shoulder 103'b provided at the exterior of the projection 103'a with which the outer flanges 102'b of the outer flanged wheel are brought into contact and run thereon. The stepped shoulders 103'b are formed at a position which is at a higher level by one step than a wing portion 103'c of the core bar member 103'. There are also shown a steel cord 104' and a lug 105'.

FIG. 4 is a cross-sectional view in the circumferential direction of the rubber crawler 101' in the above embodiment. In FIG. 4, there is shown a protruding part t' of the stepped shoulder 103'b, the interval between the core bar members denoted as s', the interval between the steel cord 1041 and the stepped shoulder 103'c denoted as v, a recess groove 106' provided between the core bar members.

As shown in FIG. 4, the stepped shoulder 103'b is concealed in such a manner that the top face m' thereof can be exposed out of the rubber base material of the rubber crawler 101'. As the interval s' between the core bar members and the interval v between the stepped shoulder 103'b and the steel cord 104' are made comparatively small, the ratio of compression of the interval v between the core bar members, which are compressed inwardly of the steel cords and are the turning portions for a drive sprocket wheel and an idler tumbler wheel, are made comparatively small as well. Therefore, the rolling vibration can be decreased and ensures a comparatively good feeling of riding. However, as shown in FIG. 5, when the rolling wheels are positioned between the core bar members, dropping or sinking of the protruding parts t' and t' is caused to occur due to the rolling load and vibrations still result therefrom.

SUMMARY OF THE INVENTION

It is therefore an object of the present invention to decrease such vibrations as much as possible by lessening the dropping or sinking of the rolling wheels.

The first embodiment comprises core bar members for a middleflanged rolling wheel. The core bar members have a pair of projection top faces which protrude upwardly by a fixed height and have a protruding part of a fixed length in the direction of wing portions. The left and right projections of the core bar members include the protruding parts which are arcuate on their top face with the approximate center part of the arc at the bottom thereof.

The second embodiment includes a rubber crawler device in which the core bar members of the above construction are utilized and it features a plurality of the core bar members concealed in parallel with a fixed interval between core members so that projections which have been formed arcuately in the width direction of the inner circumferential side of rubber crawlers are projected.

The rubber crawlers, in which core bar members are concealed can improve the defects of conventional core bar members as shown below:

As the rolling wheel part rides on the protruding part of one of the core bar members, the protruding part thereof drops or sinks, and the range from the protruding part to the center point of the top face thereof is made almost parallel to the inner circumferential face of the crawler. Then, the inclination of the top face is gradually restored as the rolling wheel part rolls toward the center point from the protruding part and the rolling wheel can proceed at almost a fixed height from the inner circumferential face of the rubber crawler therebetween.

Next, the protruding part gradually drops or sinks as the rolling wheel part advances on the top face to the other protruding part of the core bar members from the center point. Then, the rolling wheel can still proceed almost at a fixed height from the inner circumferential face of rubber crawler therebetween.

As a result, the rolling wheel can proceed at almost a fixed height over the full range of the top face of the projections. Furthermore, as the protruding part gradually approaches the protruding part of a next adjacent core bar member in the circumferential direction when the projection part drops or sinks, the interval between the core bar members can be shortened as much as possible.

In the present invention, in the case where the protruding parts in a pair of left and right projections are formed so that they protrude only in one direction and in opposite directions in zigzag manner to each other and are concealed in the rubber crawler, the same action as described above can be achieved. In such an embodiment, even if the interval between the adjacent core bar members is sufficiently secured in order to prevent a problem which may occur at the turning part of the drive sprocket wheel, namely, collision between core bar members mutually adjacent to each other forwards and backwards in the circumferential direction of the rubber crawler, the interval between the protruding parts can be greatly reduced. Therefore, the rolling track can be made almost continuous and the present embodiment significantly minimizes dropping or sinking of the rolling wheels.

The above protruding parts are all preferably formed to be arcuate. However, it is anticipated that the top face of left and right projections including the protruding parts can be formed to have an inclination rising toward the side in opposing directions to each other.

The third embodiment includes a core bar member for outerflanged rolling wheels. The core bar member has a part of the left and right wing portions at the outside of a pair of projections which protrude to a fixed height upward and provides a pair of stepped shoulders which are higher in level by one step than the height of the wing portions. Each of the stepped shoulders is a running face for the rolling wheel. The core bar member includes a protruding part which protrudes by a fixed length forward and backward in the width direction of the wing portions, is formed at each of the stepped shoulders and is inclined upward and becomes higher in level in the direction toward the front and rear protruding parts.

The fourth embodiment includes a rubber crawler device in which the core bar members of the above construction are utilized and includes a plurality of the core bar members which are concealed with a fixed interval in the width direction of the inner circumferential face of the rubber crawler under such a state that the upper face of each of the stepped shoulder is exposed to the inner circumferential face of the rubber crawler.

Therefore, the rubber crawlers in which core bar members are concealed can improve the defects of conventional ones as shown below:

As the protruding part drops or sinks when the outer flanges ride on the protruding part of the stepped shoulder, the upper face of the stepped shoulder is made almost parallel to the inner circumferential face of the crawler. As the outer flanges thereof travel on the upper face of the stepped shoulder from the protruding part toward the center part of the core bar member, the inclination of the upper face of the stepped shoulder can be gradually restored and the outer flanges will be made to advance almost at a fixed height from the inner circumferential face therebetween.

Next, as the protruding part gradually drops or sinks with the advancement of the outer flanges on the upper face of the stepped shoulder from the center part to the protruding part, the outer flanges can travel almost at the same fixed height from the inner circumferential face therebetween.

Therefore, as a result, the rolling wheel can run on a similar height position over the full range of the upper face of the left and right stepped shoulder. In this case, when the protruding part drops or sinks, the protruding part gradually approaches the stepped shoulder of the next core bar member adjacent in the circumferential direction, thereby causing the interval between the core bar members to be narrowed as much as possible. Thus, the rolling track is made almost continuous and the rolling vibrations can be substantially lessened.

The shape between the front and rear protruding parts in the width direction of left and right wing portions in each of the stepped shoulders is made low, similar to the height of the wing portions in the core bar members of the present invention. The upper face of each of the stepped shoulders is formed to be of inclined face with the protruding part side made higher in level by making each of the stepped shoulders a protruding part only at one side in the width direction of the wing portions and the respective protruding parts opposing each other at the left and right positions. In the above construction, as the outer flanges of the rolling wheel push and compress only the protruding part of each of the stepped shoulders, it reduces the width dimension of the outer flanges of the rolling wheel.

The base part of the projection of the core bar members protrude towards the side contrary to the protruding side of stepped shoulders in the present invention. With this arrangement, respective corners and stepped shoulders between adjacent core bar members do not cause large distortions as they can be brought, from time to time, into contact with each other against such force as distortion, etc. Therefore, it has a great effect in preventing the wheels from slipping off.

BRIEF DESCRIPTION OF THE DRAWINGS

FIGS. 6 through 8 show the first embodiment of the invention wherein FIG. 6 is a perspective view of a core bar member for a mid-flanged rolling wheel in accordance with the invention, FIG. 7 shows a first core bar member therefor, FIG. 8 is a perspective view of a second core bar member, FIGS. 9 through 13 show the second embodiment wherein FIG. 10 is an explanatory view to describe the actions when a rolling wheel rolls on the above rubber crawler device, FIG. 11 is a plan view of the rubber crawler device in which a core bar member according to FIG. 7 is concealed, FIG. 12, is ;a partially broken perspective view of the rubber crawler device in which a core bar member according to FIG. 8 is concealed, FIG. 13 is an explanatory view to describe the actions thereof, FIGS. 14 through 16 show a third embodiment wherein FIG. 14 is a perspective view of a core bar member for an outer flanged rolling wheel, FIG. 15 and 16 are perspective views showing a further core bar member, FIGS. 17 through 22 show the fourth embodiment wherein FIG. 17 is a partially broken perspective view showing a rubber crawler device in which a core bar member according to FIG. 14 is concealed, FIG. 18 (1), (2) and (3) are explanatory views to describe the actions when the rolling wheel rolls on the above rubber crawler device, FIG. 19 is a partially broken perspective view showing the rubber crawler device in which the core bar member according to FIG. 15 is concealed, FIG. 20 (1) and (2) are explanatory views to describe the actions when the roller wheel rolls on the rubber crawler device, FIG. 21 is a plan view of a rubber crawler device in which the core bar member according to FIG. 16 is concealed, and FIGS. 22 A and B are explanatory views to describe the action of the rubber crawler device.

PREFERRED EMBODIMENTS OF THE PRESENT INVENTION

Figure 1:
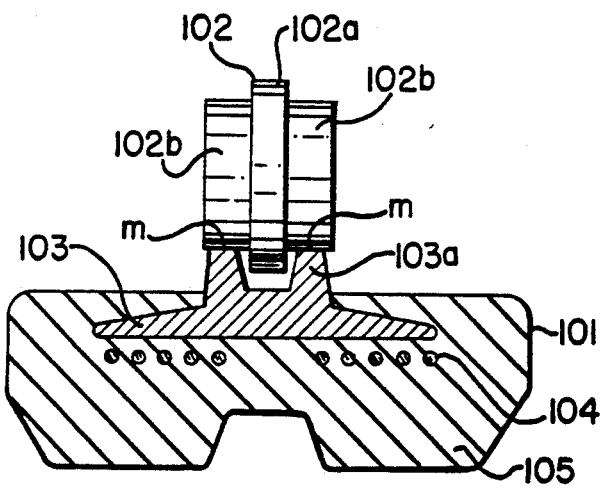
FIG. 1 is a cross-sectional view in the width direction of a conventional rubber crawler device in which mid-flanged rolling wheels are used.
Figure 2:
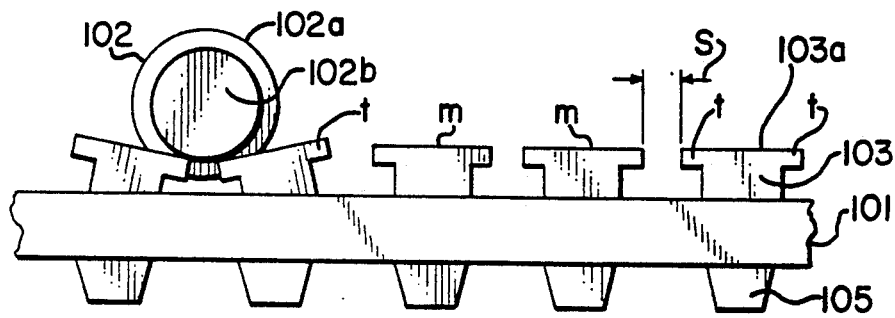
FIG. 2 is a side elevational view of FIG. 1 in the circumferential direction.
Figure 3:
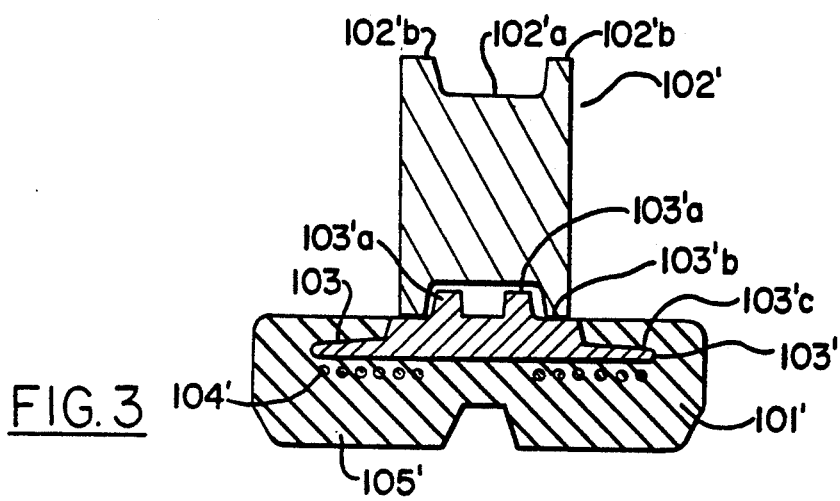
FIG. 3 is a cross-sectional view in the width direction of a conventional rubber crawler device in which outer-flanged rolling wheels are used.
Figure 4:
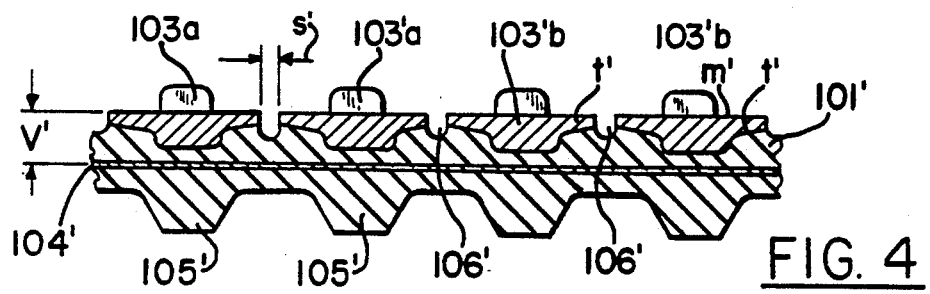
FIG. 4 is a side elevational view of FIG. 3 in the circumferential direction.
Figure 5:
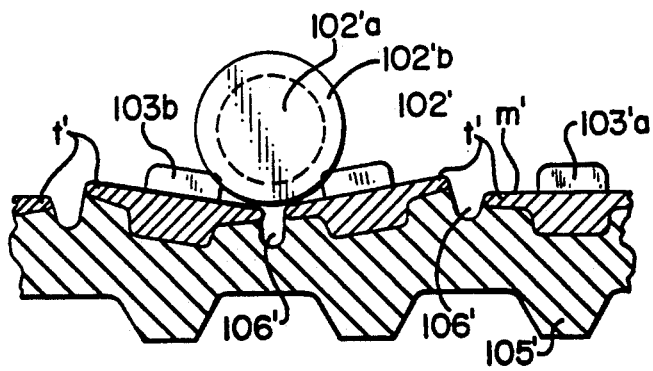
FIG. 5 is a descriptive view for explaining the actions of the above embodiments.
Figure 6:
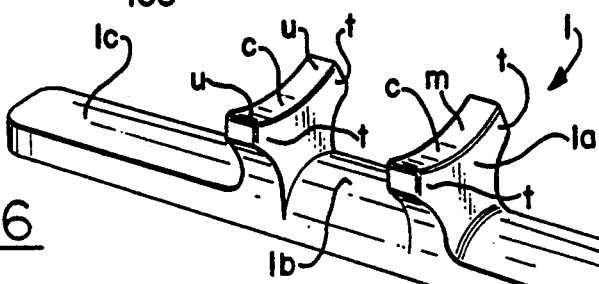

A first preferred embodiment of the invention is described with reference to FIGS. 6 through 8. In FIG. 6, there is a core bar member 1, a projection 1a, an engaged portion with a drive sprocket wheel 1b and a wing portion 1c, respectively; top face m and protruding part t of the projection 1a, respectively; the end part U and center point C of the top face m, respectively; (0 is the center line of the projection 1a).

Here, the protruding parts t, t are provided before and behind the projection 1a and the top face m is formed to be upwardly arcuate with the region of the center point C made the bottom thereof and the general sectional shape is roughly Y-shaped.

Therefore, the middle engaged portion lb is shaped almost identically to the tooth bottom of the drive sprocket wheel in order to be engaged with the drive sprocket wheel, (in the present preferred embodiment, it has been a semi-circular column on the section thereof) . Either of them may be of the same shape as that of an already known core bar member of rubber crawler.

Figure 7A:
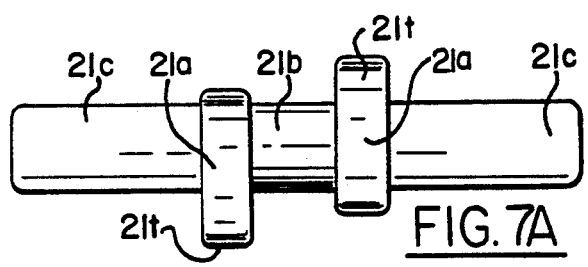
FIG. 7A is a plan view of FIG. 7.
Figure 7B:
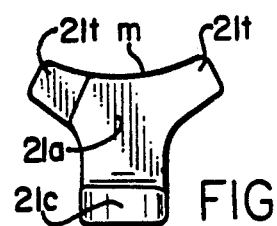
FIG. 7B is a side elevational view of FIG. 7.

FIGS. 7A and 7B show the core bar member 21 f or a rubber crawler device having a projection 21a, an engaged portion 21b, a wing portion 21c, a protruding part 21t and the top face m. The embodiment is such that the protruding part 21t is provided only on one of the left and right projections 21a, 21a so as to be in opposite directions to each other at the left and right wing portion sides.

Figure 8:
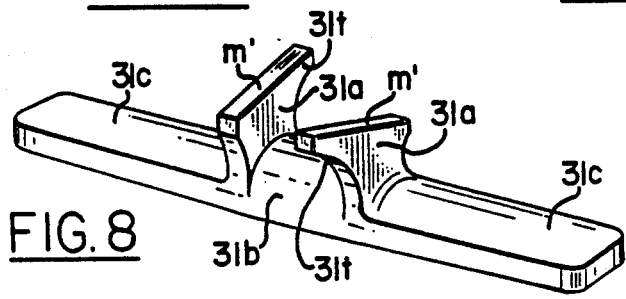

FIG. 8 shows a core bar member according to still another embodiment, and although the top face of projections is formed to be upwardly arcuate in each of the above embodiments, the present preferred embodiment is constructed so that the respective top faces m' of left and right projections 31a, 31a are formed to be of upward inclination, and in opposite directions to each other toward the protruding part side.

Figure 9A:
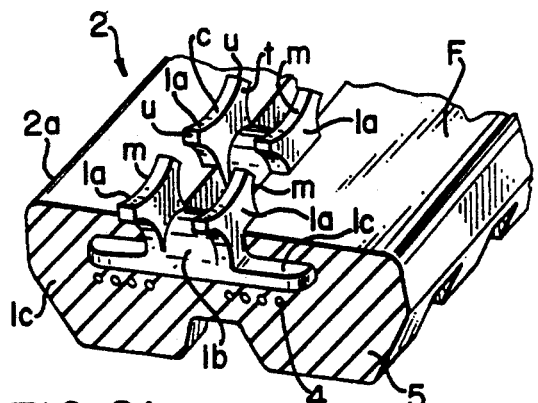
FIG. 9A is a partially broken perspective view of a rubber crawler device in which a core bar member according to FIG. 6 is concealed.

The second preferred embodiment is described with reference to FIGS. 9 through 13. FIG. 9A shows a rubber crawler 2 in which the core bar member described in FIG. 6 is concealed. In this figure, there is a crawler body 2a, the inner circumferential face F of the crawler body 2a, steel cords 4 and a lug 5.

Figure 9B:
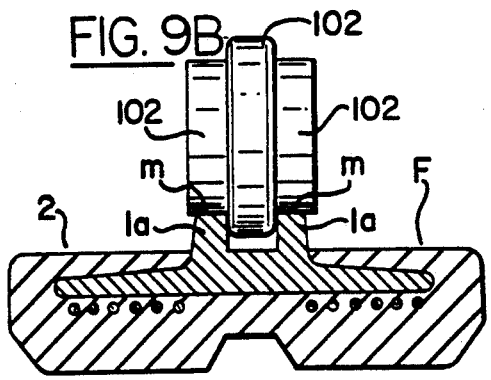
FIG. 9B is an explanatory view to describe the section showing the engaged status with a roller wheel.

In the present invention, as shown in FIG. 9B, projections 1a, 1a . . . are arrayed in two left and right rows in the circumferential direction on the inner circumferential face F of the rubber crawler. The left and right side wheels 102b, 102b of a rolling wheel 102' (in the present embodiment, mid-flanged rolling wheel) roll on the left and right top faces m, m, respectively.

Figure 10:
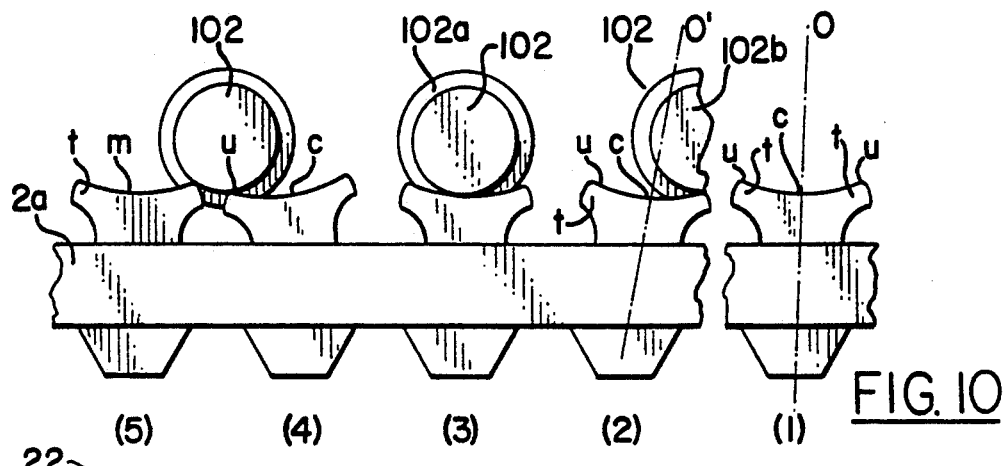

FIG. 10 is a side elevational view of the rubber crawler according to FIG. 9 and is an explanatory view to describe the actions when the rolling wheel 102 rolls on the top face m. As shown in FIG. 10 (1), the protruding parts t, t protrude arcuately diagonally upwards at both the sides of the center line O., Therefore, as shown in FIG. 10 (2), the distortion may be generated at the edges of the concealing portion of the core bar member 1 inside the crawler body 2a when the side wheel 102b rides on one edge portion U of the top face m, and the center line is inclined to become O', thereby causing the protruding part t to drop or sink. The range from the dropped or sunk edge portion U to the vicinity of the center point C is made almost parallel to the inner circumferential face F. In this case, the dropped or sunk protruding part t approaches the adjacent protruding part t, thereby causing the interval between the core bar members to be shortened.

Next, as the side wheel 102b rolls toward the center point C, the protruding part t gradually rises and the inclination of the top face m is gradually restored. During this interval, the side wheel 102b goes almost at a fixed height and, as shown in FIG. 10 (3), when the side wheel 102b reaches the center point C, the inclination of the top face m is restored and the side wheel 102b rolls from the center point C to the other edge portion U. Then, when the side wheel reaches the other edge portion U, the range from the dropped or sunk edge portion U to the vicinity of the center point c is made almost parallel to the inner circumferential face F. Accordingly, the side wheel 102b goes almost at a fixed height over the range, (FIG. 10 (4) and (5)).

As a result, the rolling wheel can go at a fixed height over the full range of the edge portions U, U. Moreover, when the rolling wheel 102 rides on the edge portion U of another core bar member, the protruding part t approaches the adjacent protruding part t, thereby causing the interval between the core bar members to be shortened. Therefore, dropping or sinking of the rolling wheel can be substantially decreased.

Figure 11:
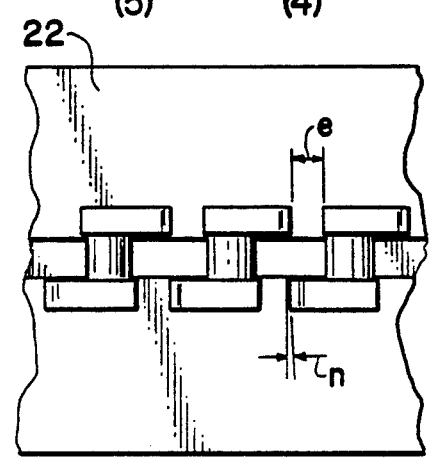

FIG. 11 shows a rubber crawler 22 in which the core bar member described in FIG. 7 is concealed. At this time, e is the interval between the core bar members and n is the interval between the protruding parts. As shown in this figure, it is possible to make the interval n between the protruding parts sufficiently small for the interval e between the core bar members. Even though the interval e between the core bar members is formed so as to have sufficient dimension in order to prevent collision of the core bar members before and behind in the circumferential direction of the rubber crawlers at the turning part of drive sprocket wheel, etc., it is possible to make the interval n between the protruding parts small. Therefore, the rolling track can be made almost continuous and the rolling wheels can almost be prevented from dropping or sinking.

Figure 12:
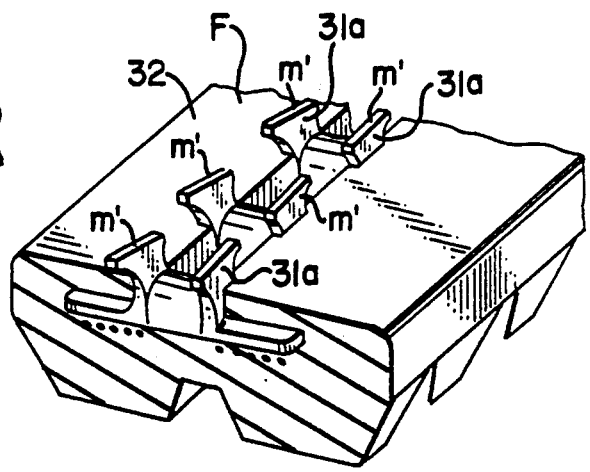
Figure 13:
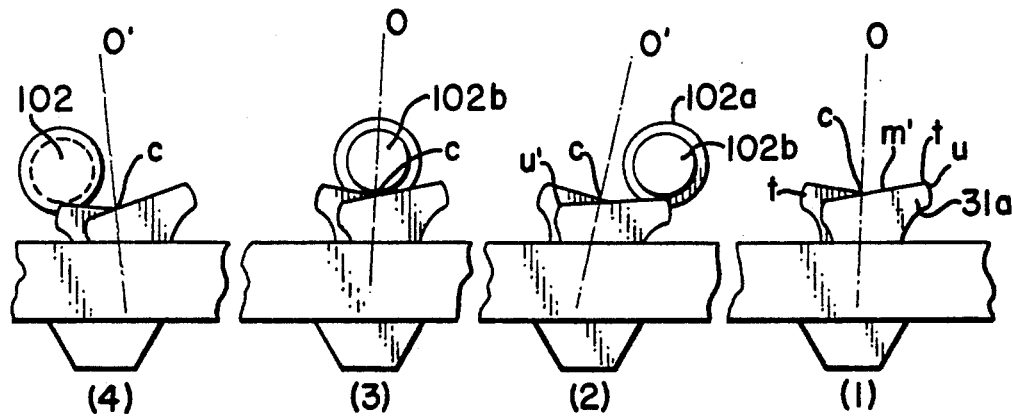

FIG. 12 is a rubber crawler 32 in which the core bar member according to FIG. 8 is concealed and the upward inclination of the top faces m', m' of the left and right projections 31a, 31a are inclined in opposite directions to each other and are inclined in the same direction in the same row thereof. When the rolling wheel 102 rolls on the top face m', the action thereof is as follows:

FIG. 13 is an explanatory view to describe the action thereof. First in FIG. 13 (1), 0 is the center line of the projection body 31 and, as shown in this figure, the protruding parts t, t of the projection bodies 31a, 31a, which are inclined in opposite directions at this side and the back side of the drawing protrude diagonally upwards at both the sides of the center line 0. As shown in FIG. 13 (2), when the side wheel 102B of this side rides on the side edge part U of the protruding part of the top face m', distortion may be generated at the edge of the concealing portion of the core bar member 3 inside the crawler body 32 and the center line is inclined and becomes O', thereby causing the protruding part t to drop or sink and the top face m' is made almost parallel to the inner circumferential face F. In this case, as soon as the protruding part t drops or sinks, it approaches the adjacent projection 31a and shortens the interval between core bar members. Thus, the rolling track is made almost continuous. Next, as the side wheel 102b advances toward the center point C, the protruding part t is gradually raised and the inclination of the top face m' can be restored. During this interval, the side wheel 102b can advance almost at a fixed height, (during this time, the side wheel 102b at the back of the drawing is above and between the side edge part U' of non-protruding part and center point C of the top face m' of the same side and is not engaged with the top face m'). As the side wheel further advances, the side wheel 102b at the back side of the drawing will be caused to roll between the center point C of the top face m' of the same side and the side edge part U of the protruding part, and the protruding part t at the back side of the drawing is gradually dropped or sunk; (also, during this time, as soon as the protruding part t drops or sinks, it approaches the adjacent projection body 31a and the rolling tracks are made almost continuous) . As shown in FIG. 13 (4), the top face m' is made almost parallel to the inner circumferential face F when the side wheel 102b reaches the side edge part U of the protruding part. As above, the wide wheel 102b can advance almost at a fixed height during this interval. (However, the side wheel part 102b of this side of the drawing is above and between the center point C of the top face m' of the same side and the side edge part U of the non-protruding part and is not engaged with the top face m'). As a result, in this figure, the rolling wheel 102b can advance almost at a fixed height in the full range between the side edge parts U, U of the protruding part of the respective top faces m' at this side and the back side of the drawing and, furthermore, as the protruding part t approaches the adjacent projection body 31a when the rolling wheel is at the side edge part U of the protruding part, the rolling track is made continuous and the rolling wheel can be prevented from dropping or sinking.

A third preferred embodiment of the invention is described with reference to FIGS. 14 through 16.

In FIG. 14, there is a core bar member 41, a projection 41a of the core bar member, engaged portion 41b with the drive sprocket wheel and a wing portion 41c, respectively. A stepped shoulder 41d is higher in level by one step than each of the wing portions in the vicinity of the boundary of the outside of each projection 41a and protrudes forwards and backwards of the width of the wing portion, the upper face m of the stepped shoulder being flat in the width of the wing portion and upwardly inclined toward the protruding portion t.

FIG. 15 shows a case of a core bar member 41 wherein the intermediate portion between the front and back protruding parts t, t of each stepped shoulder 41d of the above embodiment is made lower in level by one step, namely the flat portion is omitted and is concurrently used as wing portion 41c.

In the above embodiment, each of the stepped shoulders 41d, 41'd protrudes by a fixed length in both the front and back directions of the core wing portions 41c, 41'c. However, the protruding parts t are provided only in opposing directions in the core bar member 41" of FIG. 16, and moreover, one side edge of each projection 41" is projected (w) slightly toward the side in the opposite direction along which the stepped shoulder protrudes.

A fourth preferred embodiment of the invention is described with reference to FIGS. 17 through 22.

Figure 18:
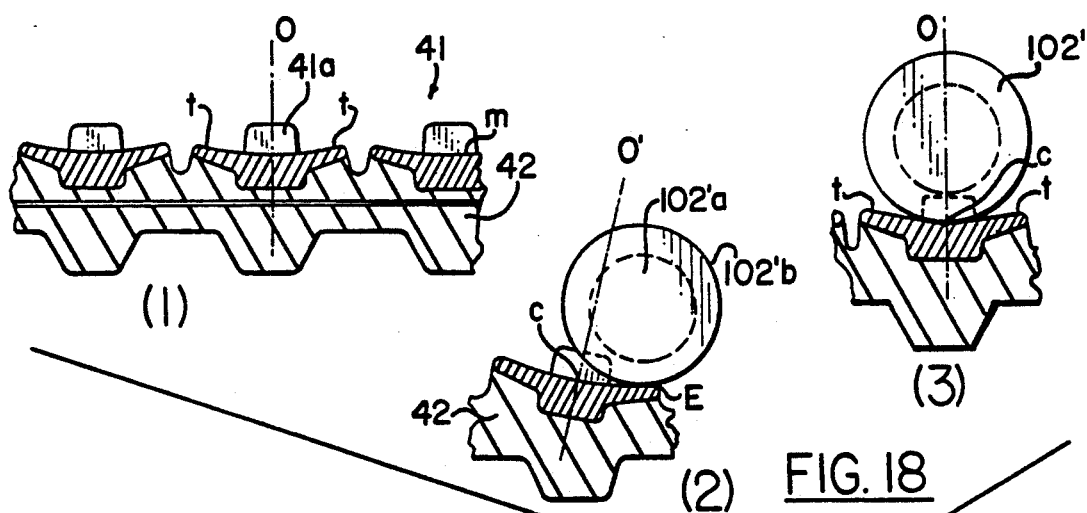

FIG. 17 shows a rubber crawler 42 in which a core bar member 41 described in FIG. 14 is concealed. FIG. 18 is an explanatory view to describe the action when the rolling wheel runs. In FIG. 18 (1), 0 is the center line of the core bar member. As shown in the drawing, the protruding parts t, t protrude diagonally upward at both the sides of the center line 0. As shown in FIG. 18 (2), distortion may be generated at the concealing portion of the core bar member 41 inside the crawler 42 when the outer flanges 102'b of the outer-flanged rolling wheel 102 rides on the edge portion of the protruding part t, and the center line thereof is inclined and becomes O' and the protruding part t drops and sinks. Then, the upper face thereof is made almost parallel to the inner circumferential face F of the crawler. In this case, as soon as the protruding part t drops or sinks, it approaches the adjacent protruding part t, thereby causing the interval between the core bar members to be shortened and causing the rolling track to be made almost continuous. Next, as the outer flanges 102'b advance toward the center point C, the protruding part t is gradually raised or restored. During this time, the outer flanges 102'b can advance almost at a fixed height.

In FIG. 18 (3), the roll wheel 102' reaches the center point C, inclination of the upper face m thereof is restored, and the rolling wheel 102' further advances, the outer flanges 102'b is caused to roll between the center point C of the upper face m and the side edge portion t of the protruding part. Accordingly, the other protruding part t gradually drops or sinks, and the outer flanges 102'b can advance almost at a fixed height during this time as well.

As a result, the rolling wheel 102' can advance at the same height over the full range between the protruding part sides t, t of the upper face m. Moreover, as the protruding part t approaches the adjacent protruding part when the rolling wheel 102' is on the side edge portion of the protruding part, the rolling track is made continuous and the rolling wheel 102' can be prevented from dropping or sinking.

Figure 19:
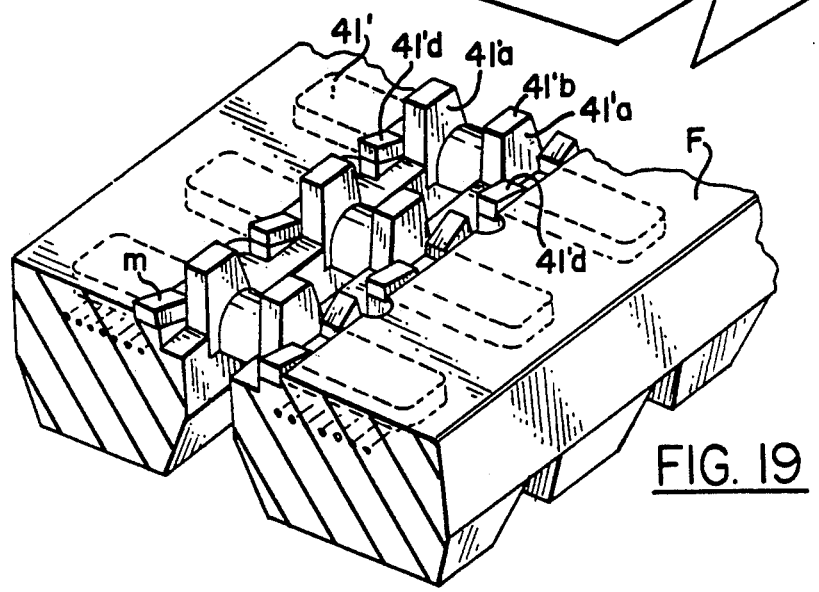

FIG. 19 shows a rubber crawler device in which the core bar member 41' according to FIG. 15 is concealed. The intermediate portion between the protruding parts t, t arrayed in the same row on the inner circumferential face F is constructed so that it can be made lower by one step.

Figure 20:
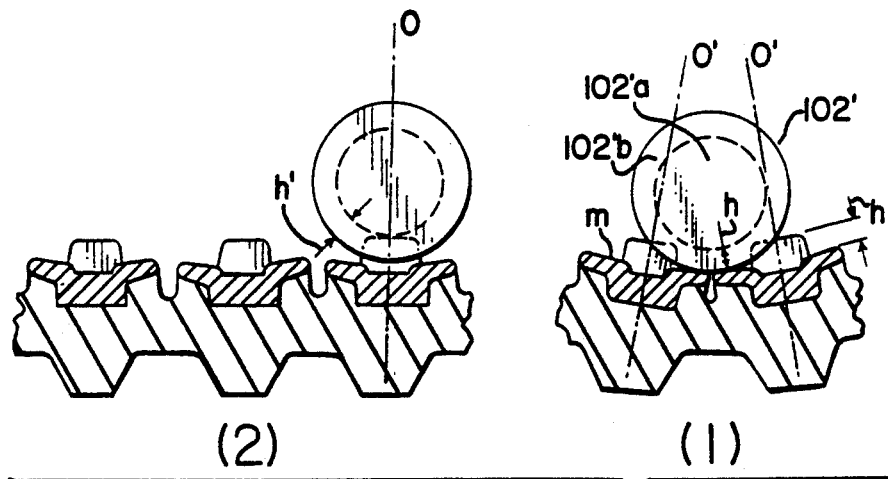

FIG. 20 (1) and (2) are explanatory views to describe the action when the rolling wheel rolls on the rubber crawler device. The inner wheel 102'a and outer flanges 102'b of the rolling wheel 102' are constructed so that they are kept in contact with the top face of the projection and the upper face m of the protruding part t. For this reason, the step gap h between the top face and the upper face of the stepped shoulder is made to be of the same dimension as that of the step gap h' between the inner wheel 102'a and the outer flanges 102'b. Here, as shown in FIG. 20 (1), when the roller wheel 102 is placed on the projection, the inner wheel 102'a rides on the top face and the projection supports the load of rolling wheel.

Figure 21:
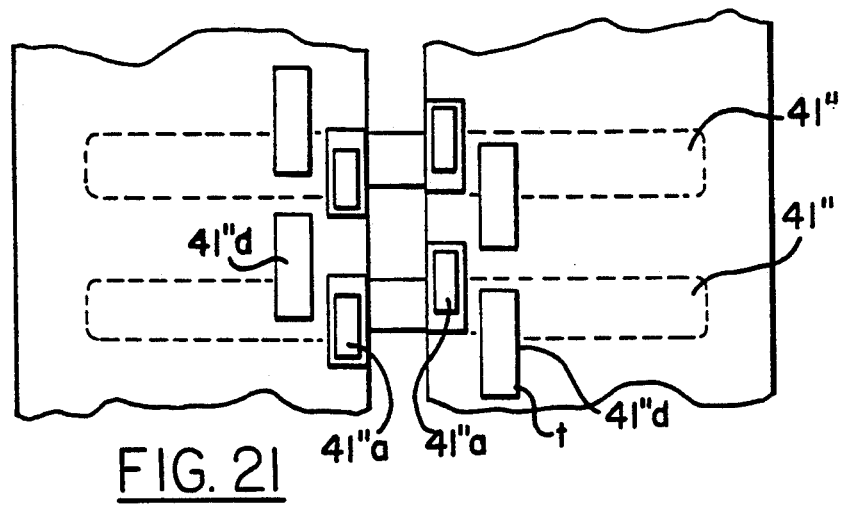

FIG. 21 is a plan view of the rubber crawler device in which the core bar member 4111 according to FIG. 16 is concealed, and FIG. 22 (A) and (B) are explanatory views to describe the action of the rubber crawler device.

Figure 22A:
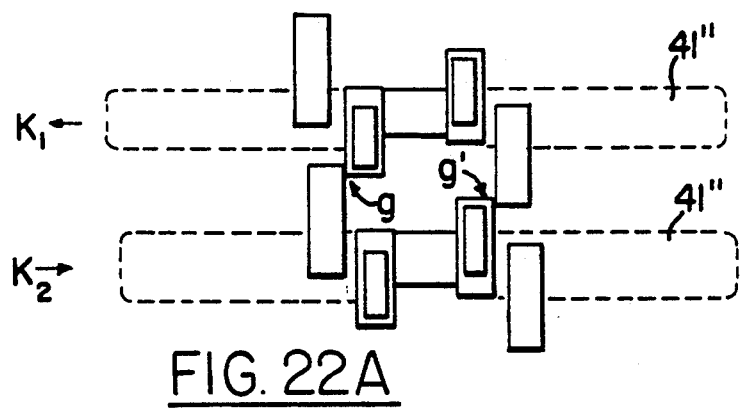
Figure 22B:
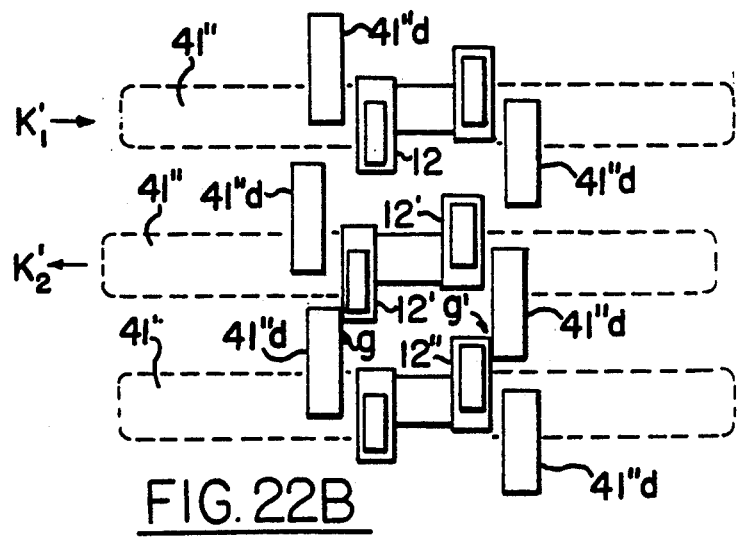

As shown in FIG. 22(A), in the case that a force which produces distortion in the direction of arrows k1, k2 acts in the crawler body, the respective projection and stepped shoulder confronting thereto between the adjacent core bar members 41", 41" will be brought (g, g') into contact with each other. To the contrary, as shown in FIG. 22(B), although contact between the projection and the stepped shoulder is not obtained between the core bar members 41", 41" for the distortion in the direction of arrows K1', K1' in the crawler body, the same relation as that in FIG. 22(A) is established between the core bar members 41", 41". Accordingly, the projection and the stepped shoulder are brought into contact with each other, thereby preventing local distortion from being produced, and the rolling wheels are prevented from slipping off.

As described above, a core bar member according to the present invention and a rubber crawler device in which such a core bar member is utilized are used in such a type of transportable construction equipment, etc. wherein mid-flanged rolling wheels and outer-flanged rolling wheels are adopted.

What is claimed is:

1. A core bar member for a rubber crawler which includes:
    (a) a pair of projections, each of said projections having an upper face;
    (b) left and right wing portions
    (c) said upper faces of said pair of projections protruding to a fixed height upward and having protruding parts having a width direction and of a fixed length in said width direction of said left and right wing portions;
    (d) the upper faces of said left and right projections including said protruding parts being upwardly arcuate and having a center portion with said center portion of said upwardly arcuate protruding parts being the bottom thereof.

2. A core bar member for a rubber crawler as defined in claim 1, wherein said rubber crawler has an inner circumferential face and wherein plural core bar members are arrayed and concealed with a fixed interval such that said projections protrude in said width direction on said inner circumferential face of said rubber crawler.

3. A core bar member for a rubber crawler which includes:
    (a) a pair of projections, each of said projections having an upper face;
    (b) left and right wing portions;
    (c) said upper face of each of said pair of projections protruding to a fixed height upward and having protruding parts having a width direction and of a fixed length in said width direction of left and right wing portions;
    (d) said pair of the upper faces of said projections being upwardly arcuate and each having a center portion with said center portions being the bottom thereof;
    (e) said protruding parts provided only in one side and extending in opposing directions to each other.

4. A core bar member for a rubber crawler as defined in claim 3, wherein said rubber crawler has an inner circumferential face and wherein plural core bar members are arrayed and concealed with a fixed interval such that said projections protrude in said width direction on said inner circumferential face of said rubber crawler.

5. A core bar member for a rubber crawler which includes:
    (a) a pair of projections, each of said projections having an upper face;
    (b) left and right wing portions;
    (c) said upper face of each of said pair of projections protruding to a fixed height upward and having protruding parts having a width direction and of a fixed length in said width direction of left and right wing portions;
    (d) said pair of the upper faces of said projections being inclined upwardly in opposing directions to each other, respectively.

6. A core bar member for a rubber crawler as defined in claim 5, wherein said rubber crawler has an inner circumferential face and wherein plural core bar members are arrayed and concealed with a fixed interval such that said projections protrude in said width direction on said inner circumferential face of said rubber crawler.

* * * * *